3,494,905
CONVERSION OF POLYMERS CONTAINING CHLORINE AND/OR BROMINE ATOMS TO POLYMERS CONTAINING HYDROXYL GROUPS

Leo W. Tyran, Lewiston, N.Y., assignor to E. I. du Pont de Nemours and Company, Wilmington, Del., a corporation of Delaware
No Drawing. Filed Nov. 29, 1967, Ser. No. 686,727
Int. Cl. C08f 27/02, 27/14
U.S. Cl. 260—87.1                                        16 Claims

ABSTRACT OF THE DISCLOSURE

Halogen-containing polymers having chlorine and/or bromine atoms on aliphatic carbon atoms, e.g., chlorinated linear polyethylene, polyvinyl chloride and copolymers of vinyl chloride and vinyl acetate, are converted to polymers containing hydroxyl groups in place of such chlorine or bromine atoms by heating such a halogen-containing polymer at 70–220° C., preferably 140–200° C., with a metal formate, e.g., sodium or potassium formate, in a non-aqueous liquid medium to effect replacement of halogen atoms with formate groups, and heating the resulting formate polymer at 140–220° C., preferably 160–200° C., to effect its thermal decarbonylation. Preferably, both reactions are carried out simultaneously at 160–200° C.

CROSS-REFERENCE TO RELATED CASES

My co-pending application Ser. No. 686,694, filed Nov. 29, 1967, which discloses the production of polymeric alcohols by the thermal decarbonylation of polymeric formate esters.

BACKGROUND OF THE INVENTION

Polymeric alcohols, i.e., polymers containing hydroxyl groups, are useful as barrier coatings, films, binders, adhesives, textile sizes, and in many other well-known applications. Polymeric alcohols such as, for example, homopolymers and copolymers of vinyl alcohol are usually prepared by the partial or complete saponification, ammonolysis, hydrolysis or alcoholysis of corresponding polyesters, i.e., corresponding homopolymers or copolymers of vinyl esters of carboxylic acids. Examples of such polyesters are the homopolymers and copolymers of vinyl esters of formic, acetic, propionic and benzoic acids. Most generally, such polyesters are converted to the desired polymeric alcohols by catalyzed hydrolysis or alcoholysis reactions.

The halogen-containing polymers and copolymers of such vinyl monomers as vinyl chloride are among the cheapest of the commercially available vinyl polymers. Because of their cheapness, it has been proposed previously that they be converted to polyvinyl alcohol rather than starting with the more expensive polyvinyl compounds such as polymers of vinyl esters of carboxylic acids. However, previous attempts to replace the chlorine atoms of polyvinyl chloride with hydroxyl groups have been unsuccessful, such attempts generally resulting in dehydrochlorination of the polyvinyl chloride with the production of dark, insoluble, unsaturated products.

The present invention relates to a method for successfully converting polymers containing chlorine and/or bromine atoms to corresponding polymers containing hydroxyl groups in place of some or all of the starting halogen atoms, while avoiding any dehydrohalogenation reaction.

SUMMARY OF THE INVENTION

A halogen-containing polymer containing chlorine and/or bromine atoms on aliphatic carbon atoms of the polymer structure is converted to a polymer containing hydroxyl groups in place of some or all of such halogen atoms, by reacting such a halogen-containing polymer at 70–220° C., preferably 140–200° C., with a metal formate in a non-aqueous liquid medium to effect replacement of halogen atoms in the polymer with formate groups and heating the resulting polymer containing formate groups at 140–220° C., preferably 160–200° C., to effect thermal decarbonylation of the formate groups and produce a product polymer containing hydroxyl groups. Preferably, both reactions are carried out simultaneously by heating the starting polymer with an alkali metal formate at 160–200° C.

Certain products obtained by the method of the invention from chlorinated linear polyethylene or polyvinyl chloride are believed to be new.

DETAILED DESCRIPTION AND PREFERRED EMBODIMENTS

The starting halogen-containing polymer having chlorine and/or bromine atoms, hereinafter referred to simply as "halogen" atoms, may be any polymer containing halogen atoms attached to aliphatic carbon atoms of the polymer structure. Illustrative of such polymers are the chlorinated polyethylenes; the homopolymers and copolymers of chloroprene; the copolymers of allyl chloride; the copolymers of trichloroethylene; the homopolymers and copolymers of vinyl chloride with comonomers copolymerizable therewith, e.g., the vinyl chloride-vinyl acetate copolymers; the homopolymers and copolymers of vinylidene chloride with comonomers copolymerizable therewith; and the corresponding bromine-containing polymers. Generally, the chlorine or bromine content of the starting polymer will be at least about 2% of the polymer weight.

The metal formate reactant may be any metal formate which is molten at the reaction temperature or which is soluble to a substantial extent, i.e., at least 0.1%, in the liquid medium in which the reaction of the metal formate with the halogen-containing polymer is carried out. Examples of such metal formates are the alkali metal formates and the formates of lead, cadmium and barium. The sodium and potassium formates are generally preferred because of their relative cheapness and availability, and potassium formate is particularly preferred because it is generally more reactive than the other formates. The metal formate should be employed in an amount that is at least stoichiometrically equal to the halogen atoms that are to be replaced in the polymer. Most generally, a considerable excess of the stoichiometric amount will be employed and large excesses are usable.

The reaction between the metal formate and the halogen-containing polymer is advantageously carried out in a non-aqueous liquid medium which does not adversely affect the reaction. The liquid meduim should be essentially non-aqueous, e.g., it should contain not more than about 3% water, based upon the weight of the starting halogen-containing polymer. Preferably, the medium is a liquid in which the starting halogen-containing polymer and the metal formate are at least slightly soluble. Examples of such liquids are high-boiling alcohols such as tetrahydrofurfuryl alcohol, ethylene glycol, diethylene glycol, propylene glycol, dipropylene glycol, ethylene glycol and diethylene glycol monoethyl ethers, and the monoacetates of such monoethyl ethers; high-boiling hydrocarbons such as xylene, triethylbenzene and kersosene; and mixtures of such hydrocarbons with such alcohols; and dimethyl formamide and dimethylsulfoxide.

The above liquids are also suitable for use as liquid media in which intermediate formate groups (resulting from the reaction of the halogen-containing polymer with the metal formate) are converted to hydroxyl groups.

The method of the invention appears to involve two separate reactions. The first is the reaction of the halogen-containing polymer with the metal formate whereby halogen atoms are replaced by formate groups as indicated by Equation A:

(A) 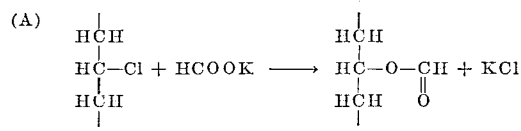

The second reaction is a thermal decarbonylation reaction wherein formate groups are converted to hydroxyl groups as indicated by Equation B:

(B) 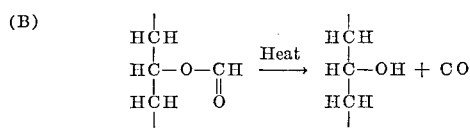

The first of the above reactions begins at temperatures as low as about 70° C., but temperatures higher than about 220° C. are advantageously avoided in order to avoid dehydrohalogenation and decomposition reactions. At temperatures below 140° C., the reaction proceeds quite slowly. The preferred temperatures are 140–200° C., since at these temperatures the reaction proceeds at a reasonable rate with no significant dehydrohalogenation occurring. The most preferred temperatures are 160–200° C. The second or decarbonylation reaction will generally require a temperature of at least 140° C., e.g., 140–220° C., but temperatures of 160–200° C. are preferred because of the higher reaction rates at such temperatures. Most preferably, both reactions will be carried out simultaneously at temperatures of 160–200° C.

In carrying out the method of the invention, a solution or dispersion of the starting halogen-containing polymer in a suitable solvent or liquid medium is heated under agitation in the presence of the metal formate reactant. Depending upon the temperature employed, the polymer may first be converted to the corresponding formate polymer, following which the heating may be conducted at an elevated temperature conducive to effecting the decarbonylation reaction whereby the formate polymer intermediate is converted to the hydroxyl-containing polymer product. On the other hand, if a mixture of the reactants in the liquid medium is heated under agitation at a sufficiently high temperature, e.g., 160–200° C., the conversion of the starting halogen-containing polymer to the intermediate formate polymer and the decarbonylation of the later will proceed simultaneously. In either procedure, the final product may be one in which all or part of the halogen atoms of the starting halogen-containing polymer are replaced in the final product by hydroxyl groups. The extent of such replacement of halogen atoms with hydroxyl groups may be varied considerably as desired and will depend upon the amount of metal formate and the reaction conditions employed, particularly the temperature and time of heating. Thus, if only partial replacement is desired, a relatively small amount of metal formate may be employed, or the reaction may be terminated when the desired extent of the replacement has been achieved. On the other hand, should complete replacement be desired, an amount of formate sufficient to achieve complete replacement will be used and the time of the reaction will be extended until all halogen atoms have been replaced by hydroxyl groups.

The invention is illustrated by the following examples in which a three-necked round bottomed flask provided with a reflux condenser, a stirrer, a thermometer and an electrically-heated mantle was employed as the reaction vessel. A "Saf-CO-Meter" carbon monoxide indicating tube was inserted into the exit of the reflux condenser to indicate when carbon monoxide evolution occurred. In the examples, all compositions expressed as percentages are by weight.

EXAMPLE 1

The reaction flask was charged with 75 g. of tetrahydrofurfuryl alcohol and 5.1 g. (0.075 gram mole) of sodium formate. The mixture was heated, with stirring, to 140° C. and a solution of 4.15 g. (containing 0.051 gram atom of chlorine) of a chlorinated linear polyethylene in 75 g. of xylene was added over a period of about 1 hour. The chlorinated polyethylene employed contained about 44% chlorine and had a melt index of 5. About 25 minutes after the drop-wise addition of the xylene solution was started, carbon monoxide evolution became noticeable, as evidenced by the color change observed in the "Saf-CO-Meter" indicating tube. The reaction mixture was heated for an additional 6.5 hours at 140–147° C., during which time a steady slow evolution of carbon monoxide occurred. After being cooled, the reaction mixture was filtered and the filter cake was analyzed and found to contain ionic chloride present as sodium chloride. The presence of ionic chloride, together with the evolution of carbon monoxide, showed the replacement of some of the chlorine atoms of the starting polymer by formate groups with at least partial decarbonylation of such formate groups.

EXAMPLE 2

The reaction flask was charged with 75 g. tetrahydrofurfuryl alcohol, 75 g. triethylbenzene, 5.1 g. (0.075 gram mole) sodium formate and 4.1 g. (containing 0.051 gram atom of chlorine) of the type of chlorinated linear polyethylene empolyed in Example 1 in small cubes. The mixture was heated, with stirring, at 175–180° C. (reflux) for 8.5 hours. After being cooled, the mixture was filtered and the filter cake was found by analysis to contain an amount of sodium chloride equivalent to approximately 29.4% of the chlorine present in the starting chlorinated polyethylene. Methanol was added to the filtrate to precipitate a product which was removed by filtration and dried in a vacuum oven at 75° C. for 2 hours. The dry product, 1.2 g., was insoluble in acetone, in methanol and in tetrahydrofuran. Elemental analysis showed it to be composed of about 58.7% carbon, 7.8% hydrogen, 27.5% chlorine and 6.0% oxygen. These data showed a partial replacement of the chlorine atoms of the starting polymer by hydroxyl groups.

EXAMPLE 3

The reaction flask was charged with 75 g. tetrahydrofurfuryl alcohol, 75 g. triethylbenzene and 6.25 g. of a commercial polyvinyl chloride (containing 0.1 gram atom of chlorine) in granular form. The polyvinyl chloride used was Goodyear Tire and Rubber Company's "Pliovic DB 90V"; it contained 56.8% chlorine and had an inherent viscosity of 1.10. The mixture was heated, with stirring, to 110° C., at which time 1 g. of sodium formate was added. The reaction temperature was gradually raised and, at 145° C., evolution of carbon monoxide was observed. When the temperature reached 150° C., an additional 9.2 g. of sodium formate (total sodium formate: 10.2 g., 0.15 gram mole) were added. The reaction mixture was then heated at 175–180° C. for an additional 6.5 hours, following which it was cooled and filtered. The filter cake contained sodium chloride equivalent to 27% of the chlorine present in the starting polyvinyl chloride. Methanol was added to the filtrate to precipitate a product which, when dried, weighed 5.4 g. and was insoluble in water, in acetone, in methanol and in tetrahydrofuran. Element analysis showed the product to be composed of 48% carbon, 6.3% hydrogen, 38% chlorine and 7.7% oxygen. These data showed a partial replacement of the chlorine atoms of the starting polymer by hydroxyl groups.

EXAMPLE 4

The reaction flask was charged with 75 g. tetrahydrofurfuryl alcohol, 75 g. triethylbenzene, 6.25 g. of the type of polyvinyl chloride used in Example 3 (containing 0.1 gram atom of chlorine) and 12.6 g. (0.15 gram mole) anhydrous potassium formate. After 4 hours heating with agitation at 155–160° C., potassium chloride was produced in an amount approximately equivalent to 56% of the chlorine present in the polyvinyl chloride, i.e., the first step reaction was about 56% complete. After a total of 17 hours, that reaction was about 88% complete. Carbon monoxide was evolved slowly during that time, but the rate of evolution increased during a succeeding 4.5 hours heating at 177° C. At that time, the first step reaction was 93.6% complete. After first removing precipitated potassium chloride by filtration, the final reaction mixture was poured into cold water and the insoluble precipitated polymer was removed by filtration. The aqueous layer of the two-phase filtrate was separated from the organic layer and extracted three times with carbontetrachloride and then concentrated to near dryness by evaporation. When the concentrate was added to methanol, a precipitate was formed. A film cast from a water solution of the precipitate showed, by infrared analysis, no carbonyl peak, a strong hydroxyl peak, and a CH/OH peak ratio similar to that observed in polyvinyl alcohol obtained by the usual alkaline catalyzed complete alcoholysis of polyvinyl acetate.

EXAMPLE 5

The reaction flask was charged with 250 g. of tetrahydrofurfuryl alcohol, 18.75 g. of the same type of polyvinyl chloride that was employed in Example 3 (containing 0.3 gram atoms of chlorine) and 37.4 g. (0.45 gram mole) of anhydrous potassium formate. The mixture was heated, with stirring, at 152–163° C. for about 24 hours, during which time about 1 liter of carbon monoxide (as measured by a wet test meter) was evolved. The mixture was then stirred and heated at 172° C. for an additional 8 hours, during which time an additional 6.5 liters of carbon monoxide were evolved. The total volume of carbon monoxide, after correction to standard temperature and pressure conditions, was 6.64 liters. This amount correspond to about 98.8% of the theoretical 6.72 liters available from complete decarbonylation of 0.3 mole of intermediate polyvinyl formate.

The potassium chloride separated from the cooled reaction mixture was 96.4% of the amount theoretically obtainable from the starting polyvinyl chloride. The product polymer, which remained soluble in the tetrahydrofurfuryl alcohol, was isolated by precipitation with ice water and dried in a vacuum oven at 75° C. for 3.5 hours. It weighed 3.5 g. or about 78.5% of theory, calculated as polyvinyl alcohol. The inherent viscosity of a 0.24% solution thereof in tetrahydrofurfuryl alcohol at 30° C. was 0.321. This polymer product was somewhat soluble in acetone and appreciably soluble in tetrahydrofuran. A dried film of the polymer product cast from a solution in tetrahydrofuran onto an Irtrans disk was clear and adhered strongly to the disk. An infrared scan of the film showed a strong hydroxyl peak, no unsaturation, no carbonyl peak and no residual chlorine. However, in contrast to the infrared scan of the product of Example 4, the scan of the above product differed from that of the usual polyvinyl alcohol made by the complete alcoholysis of polyvinyl acetate with respect to the CH/OH peak ratio. Also, the scan of this product showed a major peak at 9.3 microns instead of at 9.2 microns as is usually observed with commercial polyvinyl alcohol.

The above product contained only 0.22% residual chlorine present as potassium chloride impurity, which impurity corresponded closely to the ash content (0.49%) of the product. Disregarding the potassium chloride impurity, elemental analysis of the product showed it to be composed of 67.1% carbon, 8.6% hydrogen, and 24.3% oxygen, as compared with values of 54.55%, 9.10% and 36.35%, respectively, for pure polyvinyl alcohol prepared by the complete alcoholysis of polyvinyl acetate.

The higher carbon value and the lower hydrogen and oxygen values of the product showed that partial dehydration occurred during the prolonged heating at elevated temperatures during its preparation. Since the infrared scan showed the absence of unsaturation, the dehydration apparently occurred between pairs of hydroxyl groups rather than between a single hydroxyl group and an adjacent hydrogen atom. Since the product was too soluble in solvents such as tetrahydrofuran, acetone, and tetrahydrofurfuryl alcohol to be highly cross-linked, dehydration apparently occurred to cause internal cyclic ether ring formation rather than cross-linking.

EXAMPLE 6

The reaction flask was charged with 75 ml. tetrahydrofurfuryl alcohol, 6.6 g. of a commercial copolymer of 87% vinyl chloride and 13% vinyl acetate. (containing 0.09 gram atom of chlorine) and 12.6 g. (0.15 gram mole) of potassium formate. The copolymer used was Union Carbide Plastics Company's "VYHH" copolymer, inherent viscosity 0.50 (ASTM D–1243–58T, procedure A). The reaction mixture was heated, with stirring, for 4.5 hours at temperatures gradually increasing from 70° C. to 158° C. It was observed that reaction of the potassium formate with the polymer began at about 70° C. and increased as the temperature was raised. The total amount of potassium chloride formed was equivalent to about 22% of the chlorine available in the starting polymer. Carbon monoxide evolution was observed during the heating in the upper part of the above temperature range.

The polymer products containing hydroxyl groups obtained by the method of the invention are useful for most of the common purposes for which polyvinyl alcohol-type products are employed. Thus, the products of Examples 4 and 5 had adhesive properties making them useful as adhesives in many common adhesive applications.

The above examples illustrate the practice of the invention to convert polymers containing chlorine atoms to polymers containing hydroxyl groups in place of part or all of the chlorine atoms. Similar starting polymers containing bromine atoms. Similar starting polymers containing bromine atoms instead of chlorine atoms can be similarly used. However, because they are cheaper and more readily available, use of the chlorine-containing polymers is distinctly preferred.

The method of the invention co-produces the polymer containing hydroxyl groups, and carbon monoxide. The latter can be recovered and used in any desired way. Thus, it can be convetred to formic acid by known methods and the resulting formic acid can be used, for example, in the production of the metal formate reactant.

I claim:

1. A method for converting a halogen-containing polymer having chlorine and/or bormine atoms on aliphatic carbon atoms of the polymer structure to a polymer containing hydroxyl groups in place of said chlorine and/or bromine atoms, said halogen-containing polymer having a chlorine and/or bromine content of at least 2% of the polymer weight and being selected from the group consisting of: (A) chlorine-containing polymers of the group consisting of: the chlorinated polyethylenes; the homopolymers and copolymers of chloroprene; the copolymers of allyl chloride; the copolymers of trichloroethylene; and the homopolymers and copolymers of vinyl chloride; and (B) the bromine-containing polymers corresponding to said chlorine-containing polymers, said method comprising reacting said halogen-containing polymer with a metal formate selected from the group consisting of the alkali metal, lead, cadmium and barium formates in a liquid medium which does not adversely affect the reaction and contains not more than 3% water based upon the weight of said halogen-containing polymer at 70 to 220° C. to effect replacement of said chlorine and/or bromine atoms with formate groups, and heating the resulting polymer containing formate groups at 140–220° C. to effect decarbonylation of said formate groups and produce a polymer containing hydroxyl groups.

2. The method of claim 1 wherein the reaction with the metal formate and the decarbonylation of the formate groups are effected simultaneously by heating the halogen-containing polymer with said metal formate at 160–200° C.

3. The method of claim 1 employing sodium formate or potassium formate.

4. The method of claim 1 employing a chlorinated polyethylene.

5. The method of claim 1 employing a vinyl chloride polymer.

6. The method of claim 1 employing a polyvinyl chloride.

7. The method of claim 1 employing a copolymer of vinyl chloride and vinyl acetate.

8. The method of claim 1 employing a liquid medium comprising a high-boiling alcohol.

9. The method of claim 1 employing a mixture of a high-boiling alcohol and a high-boiling hydrocarbon as the liquid medium.

10. The method of claim 1 wherein a chlorinated polyethylene is heated with sodium or potassium formate at 160–200° C. in a liquid medium comprising tetrahydrofurfuryl alcohol.

11. The method of claim 1 wherein a vinyl chloride polymer is heated with sodium or potassium formate at 160–200° C. in a liquid medium comprising tetrahydrofurfuryl alcohol.

12. The method of claim 1 wherein a polyvinyl chloride is heated with sodium or potassium formate at 160–200° C. in a liquid medium comprising tetrahydrofurfuryl alcohol.

13. The method of claim 1 wherein a copolymer of vinyl chloride and vniyl acetate is heated at 160–200° C. with sodium or potassium formate in a liquid medium comprising tetrahydrofurfuryl alcohol.

14. The method of claim 8 employing a polyvinyl chloride as the halogen-containing polymer and an amount of sodium or potassium formate which is in excess of that amount which is stoichiometrically equivalent to the chlorine content of the polyvinyl chloride employed, and heating said sodium or potassium formate and said polyvinyl chloride in the liquid medium at 160–200° C. until substantially all the chlorine atoms in said polyvinyl chloride have been replaced by hydroxyl groups.

15. The method of claim 14 wherein the polyvinyl chloride and the sodium or potassium formate are heated in the liquid medium until substantially all of the chlorine atoms of said polyvinyl chloride have been replaced by hydroxy groups and until a partial dehydration of the resulting hydroxyl-containing polymer occurs to form internal cyclic ether rings.

16. The method of claim 1 employing as the halogen-containing polymer chlorinated linear polyethylene and a liquid medium comprising a high-boiling alcohol.

References Cited

FOREIGN PATENTS 322,157 11/1929 Great Britain.

OTHER REFERENCES

Modern Plastics, 28, pages 95, 166 (1951).
Fieser and Fieser, Advance Organic Chem., Reinhold Publ., N.Y. (1961), pages 368–369.
Roberts and Caserio, Organic Chem., Benjamin Publ., N.Y. (1965), pages 294–295.

JOSEPH L. SCHOFER, Primary Examiner

C. A. HENDERSON, Assistant Examiner

U.S. Cl. X.R.

260—2, 29.6, 30.4, 33.4, 82.1, 87.5, 87.7, 91.3, 91.7, 92.3, 92.8, 94.9, 96